United States Patent Office 3,557,098
Patented Jan. 19, 1971

3,557,098
SUBSTITUTED-7,12-DIHYDROPLEIADENE DERIVATIVES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Mar. 4, 1968, Ser. No. 709,863
Int. Cl. C07c 87/28; C07d 51/70
U.S. Cl. 260—240                                      4 Claims

ABSTRACT OF THE DISCLOSURE 7,12-dihydropleiadenes in which the nucleus may have chloro, methyl, methoxy, methylthio or trifluoromethyl substituents and the 7-position is substituted by an aminopropylidene, aminopropyl, piperidylidene, piperidyl, pyrrolidylidene, pyrrolidyl, 2-piperidinylethylidene, 2-piperidinylethyl, 2-pyrrolidinylethylidene or 2-pyrrolidinylethyl moiety are useful as tranquilizers and antidepressants. The compounds are generally prepared by reaction of the appropriate amino Grignard reagent with a 7(12H)-pleiadenone followed by acid dehydration of the 7-hydroxy intermediate and subsequent reduction of the unsaturated derivative with phorphorus and hydroiodic acid. The 1,4-addition products also obtained via the Grignard reaction, namely 6-substituted-7(12H)-pleiadenones, are also useful as tranquilizers and antidepressants.

This invention relates to novel substituted 7,12-dihydropleiadene derivatives having useful pharmacodynamic activity. More specifically the compounds of this invention have tranquilizing and antidepressant activity as demonstrated in standard animal pharmacological test procedures.

One group of compounds which is part of this invention is represented by the following general structural formulas:

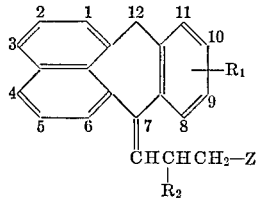
FORMULA I

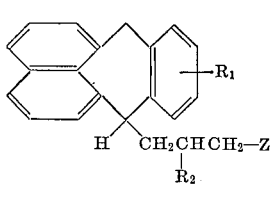
FORMULA II in which:

$R_1$ represents hydrogen, chloro, methyl, methoxy, methylthio or trifluoromethyl, preferably in the 9-position;
$R_2$ represents hydrogen or methyl, preferably hydrogen; and
Z represents diloweralkylamino, N-pyrrolidinyl, N-piperidinyl, N'-lower alkyl-N-piperazinyl, N'-(β-acetoxyethyl)-N-piperazinyl or N'-(β-hydroxyethyl)-N-piperazinyl.

Another group of compounds which is part of this invention is represented by the following general structural formulas:

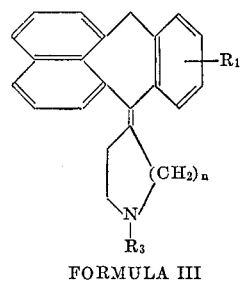
FORMULA III

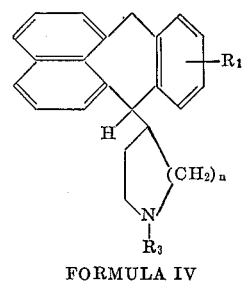
FORMULA IV in which:

$R_1$ is as defined above;
$R_3$ represents hydrogen, lower alkyl, lower alkenyl, lower alkynyl, cycloalkyl-lower alkyl, pheny-lower alkyl or hydroxy-lower alkyl; and
$n$ represents a positive whole integer, 1 or 2.

A further group of compounds which is part of this invention is represented by the following general structural formulas:

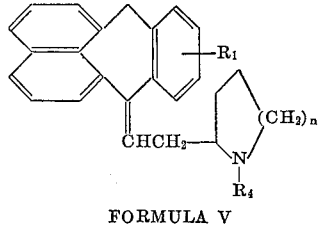
FORMULA V

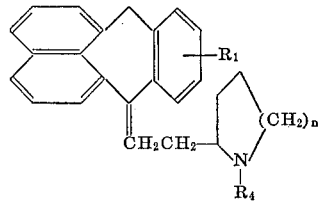
FORMULA VI in which:

$R_1$ is as defined above;
$R_4$ represents hydrogen or lower alkyl; and
$n$ represents a positive whole integer, 1 or 2.

A final group of compounds which is part of this invention is represented by the following general structural formula:

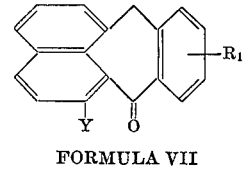
FORMULA VII in which:

$R_1$ is as defined above; and
Y represents the following:

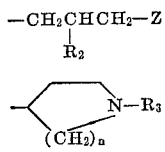

or

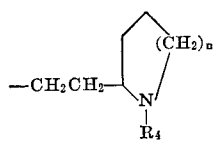

wherein $R_2$, $R_3$, $R_4$, Z and $n$ are as defined hereinabove.

By the term lower alkyl where used herein alone or as part of a larger moiety, groups having from 1 to 4 carbon atoms, preferably 1 to 2, are indicated. Cycloalkyl, lower alkenyl and lower alkynyl where used herein denote groups having 3 to 6 carbon atoms.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bis-methylenesalicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphorus and nitric acids.

The compounds of the invention are generally prepared by reaction of a 7(12H)-pleiadenone with an appropriate Grignard reagent to give a mixture of 1,2- and 1,4-addition products. The alcohols formed by 1,2-addition are dehydrate with acid to give the olefins which are reduced to give the saturated products. This reaction sequence is illustrated by the following scheme employing 7(12H)-pleiadenone and the Grignard reagent prepared from 3-dimethylaminopropyl chloride:

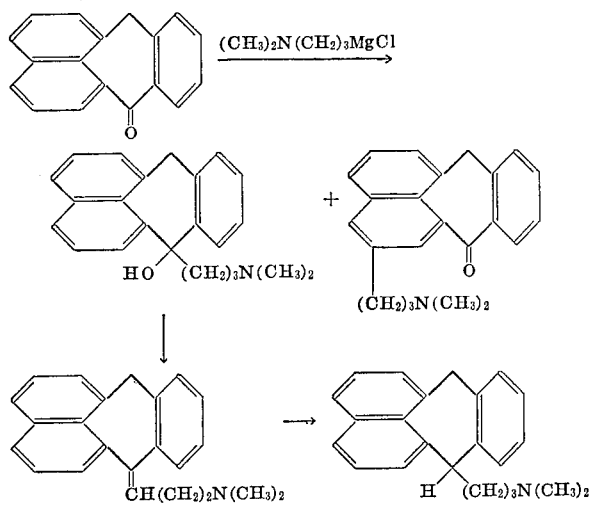

More specifically, to prepare the compounds of Formulas I and II above the 7(12H)-pleiadenone starting material is reacted with an aminoalkyl magnesium halide, preferably chloride, in an inert organic solvent such as an ether, for example diethyl ether, dioxane or preferably tetrahydrofuran. The reaction is carried out at elevated temperature such as about 35–100° C., conveniently at the reflux temperature of the solvent, for a reaction period of from about 1 to 12 hours. Workup and extraction into an organic solvent such as ether gives the separated 7-hydroxy-7-aminoalkyl-7,12-dihydropleiadene intermediate.

Treating the hydroxy intermediates with acid such as a mineral acid, for example hydrochloric or sulfuric acid, preferably at reflux for from 1 to 24 hours, results in dehydration to the 7-aminoalkylidene-7,12-dihydropleiadenes of Formula I. The latter compounds are reduced with phosphorus and hydrogen iodide to the 7-aminoalkyl-7,12-dihydropleiadenes of Formula II.

To prepare the N'-(β-hydroxyethyl)-N-piperazinylalkylidene compounds of Formula I the 7-hydroxy-N'-(β-benzyloxyethyl) analogue is heated with a mineral acid. Catalytic hydrogenation of the same benzyloxy derivative gives the corresponding N'-(β-hydroxy-ethyl)-N-piperazinylalkyl compounds of Formula II. Reacting the N'-(β-hydroxyethyl) derivatives with acetyl chloride in basic solution gives the acetoxyethyl compounds of Formulas I and II.

The compounds of Formula III above are prepared by reaction of the 7(12H)-pleiadenone starting material with an N-substituted piperidyl or pyrrolidyl magnesium halide, preferably chloride, in an inert organic solvent such as an ether, for example diethyl ether, dioxane or tetrahydrofuran. The reaction is carried out at from room temperature to the reflux temperature of the solvent, for from 30 minutes to 4 hours. The separated 7-hydroxy intermediate thus formed is dehydrated with acid to give the 7-piperidylidene or 7-pyrrolidylidene product.

The above described method may be employed to prepare compounds of Formula III wherein $R_3$ is lower alkyl, phenyl-lower alkyl, lower alkenyl or lower alkynyl by employing the appropriate N-substituted piperidyl or pyrrolidyl magnesium halide.

To prepare the compounds of Formula III where $R_3$ is hydrogen, the corresponding products wherein $R_3$ is methyl prepared as described above are demethylated. This is accomplished by reaction with cyanogen bromide followed by acid hydrolysis of the resulting cyanamide which upon workup with dilute aqueous base gives the corresponding 7-hydroxy-7-(4-piperidyl)-or-(3-pyrrolidyl) intermediates. The latter are dehydrated with acid to yield the products of Formula III where $R_3$ is hydrogen which by further alkylation affords a convenient route to the preparation of other $R_3$ substituted compounds. Thus, for example, condensation with ethylene oxide gives the β-hydroxyethyl derivatives; alkylation with an ethyl, n-propyl, allyl, propargyl, benzyl or phenethyl halide gives the corresponding alkylated derivatives; and reaction with a cyclobutane carbonyl or cyclopropane carbonyl halide gives the corresponding carbonyl derivatives which are reduced with a bimetallic hydride to the cycloalkyl-alkyl analogues.

The saturated compounds of Formula IV above are prepared advantageously via reduction of the unsaturated compounds of Formula III with phosphorus and hydrogen iodide. When $R_3$ is hydrogen, further reaction of the saturated N-unsubstituted compounds as described above gives the $R_3$ substituted derivatives of Formula IV.

The compounds of Formulas V and VI above are prepared by reaction of the 7(12H)-pleiadenone starting material with a Grignard reagent prepared from a 2-piperidinylethyl or 2-pyrrolidinylethyl chloride, optionally alkylated at the nitrogen atom. The reaction is carried out in a solvent such as tetrahydrofuran at the reflux temperature. The separated 7-hydroxy intermediates are dehydrated with acid to give the unsaturated products of Formula V which are reduced with phosphorus and hydrogen iodide to the saturated derivatives of Formula VI.

As indicated in the above reaction scheme, the initial Grignard reaction gives a mixture of 1,2- and 1.4-addition products. The latter compounds, represented by Formula VII above, are obtained whenever the 7(12H)-pleiadenone starting material is reacted with a Grignard reagent as described herein for the preparation of compounds having the Formulas I–VI. The mixture of products is separated by fractional recrystallization and identification is made by spectral determination of the carbonyl group in compounds of Formula VII.

The aminoalcohols formed by 1,2-addition of the Grignard reagent as described herein constitute a valuable part of this invention by virtue of their utility as intermediates to prepare the final products.

The 7(12H)-pleiadenone starting materials used as described herein are either known or are prepared by methods known in the art. Thus naphthalic anhydride is reacted with an appropriately substituted ($R_1$) phenyl Grignard reagent and the intermediate alcohol is reduced under Wolff-Kishner conditions to an 8-benzyl-1-naphthalene carboxylic acid. The latter is ring closed with polyphosphoric acid to give the 7(12H)-pleiadenone.

The compounds of Formulas I–VII have tranquilizing and antidepressant activity as demonstrated by decreased motor activity, low body posture, hypotonia, hypothermia and increased curiosity in rats upon oral administration of 50–200 mg./kg. At these dose levels no toxicity is observed.

The product compounds of this invention may be administered orally or parenterally in conventional dosage unit forms such as tablets, capsules, injectables or the like, by incorporating the appropriate dose of a compound of one of the Formulas I–VII with carriers according to accepted pharmaceutical practices.

The foregoing is a general description of how to prepare and use the compounds of this invention. The following examples illustrate the preparation of specific compounds having tranquilizing and antidepressant activity. However this should not be construed as limiting the scope of the invention since appropriate variations in the starting materials will produce other corresponding products set forth hereinabove.

PREPARATIONS (A) 7(12H)-pleiadenone

To a solution of 12.0 g. of naphthalic anhydride in 1 l. of toluene at 105° C. is added 26 ml. of a 3.0 M solution of phenyl magnesium bromide in ether with stirring. The mixture is refluxed for one hour under nitrogen, cooled and 500 ml. of dilute hydrochloric acid is added. The separated toluene layer is extracted with sodium bicarbonate solution. Acidification of the extract gives a solid which is taken up in ether and the dried ether solution is evaporated to give the alcohol intermediate, M.P. 134–135° C.

A mixture of the above-prepared alcohol (10.6 g.), 12.9 of potassium hydroxide, 12.8 ml. of 85% hydrazine hydrate solution and 80 ml. of diethylene glycol is heated to 90–100° C. for about eight hours under reflux. The condenser is removed while the temperature is raised to 175° C., then the condenser is replaced and heating continued for three hours. The cooled reaction mixture is diluted with water, filtered and acidified with concentrated hydrochloric acid to give 8-benzyl-1-naphthalenecarboxylic acid, M.P. 133–136° C.

The above prepared acid (2.0 g.) and 30 ml. of polyphosphoric acid is heated on a steam bath for two hours, poured into water and filtered. The solid is taken up into benzene, washed with base and the benzene removed to yield the title ketone, M.P. 115–118° C.

(B) $R_1$-substituted-7(12H)-pleiadenones

By employing in part (A), $R_1$-substituted phenyl magnesium bromide with similar subsequent reaction there are obtained the corresponding $R_1$-substituted-7(12H)-pleiadenone starting materials. Substitution of the phenyl Grignard reagent in the ortho or para positions results in the single products 11- or 9-substituted, respectively. Isomeric mixtures, 8- and 10-substituted, result when the substitution of the phenyl Grignard is in the meta position. The latter isomers are separable by conventional organic chemical techniques based on physical properties.

EXAMPLE 1

To the Grignard reagent prepared from 9.0 g. of 3-dimethylaminopropyl chloride and 1.8 g. of magnesium in tetrahydrofuran is added 12.0 g. of 7(12H)-pleiadenone in tetrahydrofuran solution. The reaction mixture is refluxed for about six hours and then decomposed with aqueous ammonium chloride solution. The solid obtained is triturated with ethanol to leave 7-hydroxy-7-(3-dimethylaminopropyl) - 7,12 - dihydropleiadene, M.P. 192–197° C. The hydrochloride salt obtained from ethanol/ether melts at 218° C. (foam).

From the ethanol used in the trituration above, there is obtained the 1,4-addition product, 6-(3-dimethylaminopropyl) - 7(12H) - pleiadenone, hydrochloride M.P. 225–227° C.

A solution of 4.9 g. of 7-hydroxy-7-(3-dimethylaminopropyl)-7,12-dihydropleiadene hydrochloride in 44 ml. of methanol with 2 drops of concentrated hydrochloric acid is refluxed for 12 hours. The reaction mixture is evaporated, dissolved in water, made basic and extracted into ether. The ether solution is evaporated to give an oil which is chromatographed (50:50 benzene-hexane) and distilled to give 7 - (3 - dimethylaminopropylidene)-7,12-dihydropleiadene.

Similarly, by employing 12.5 g. of 9-methyl-7(12H)-pleiadenone or 13.5 g. of 9-methoxy-7(12H)-pleiadenone in the above reaction sequence there are obtained the corresponding 9-methyl or 9-methoxy alcohol intermediates, the 1,4-addition products and 9 - methyl - 7 - (3-dimethylaminopropylidene) - 7,12 dihydropleiadene and 9-methoxy - 7 - (3 - dimethylaminopropylidene) - 7,12-dihydropleiadene.

EXAMPLE 2

A mixture of 2.7 g. of 7-(3-dimethylaminopropylidene)-7,12-dihydropleiadene, 2.7 g. of red phosphorus and 10 ml. of 57% hydroiodic acid is stirred and refluxed for 20 hours, then diluted with water. The resulting mixture is filtered, the filter cake is leached with hot dilute base and the filtrate made basic. Extraction with ether gives 7-(3-dimethylaminopropyl) - 7,12 - dihydropleiadene, hydroiodide salt M.P. 230° C. (foam).

EXAMPLE 3

To the Grignard reagent prepared from 10.5 g. of 3-dimethylaminopropyl chloride and 2.1 g. of magnesium in tetrahydrofuran is added 12.0 g. of 9-chloro-7(12H)-pleiadenone (M.P. 147–149° C.) in tetrahydrofuran solution. After refluxing for four hours, the reaction mixture is poured into water and extracted with ether. The crude solid obtained is chromatographed in benzene to give the separated 9 - chloro - 7-hydroxy-7-(3-dimethylaminopropyl-7,12-dihydropleiadene, hydrochloride M.P. 212–214° C.

A solution of 6.0 g. of the above prepared hydrochloride in 44 ml. of methanol with 2¼ drops of concentrated hydrochloric acid is refluxed for 12 hours. The reaction mixture is evaporated, made basic and extracted with chloroform. Evaporation of the extract yields 9-chloro-7-(3-dimethylaminopropylidene)-7,12-dihydropleiadene, hydrochloride M.P. 80° C.

Similarly, reaction of 14.5 g. of 9-methylthio-7-(12H)-pleiadenone as described above gives the corresponding 9 - methylthio-7-(3-dimethylaminopropylidene)-7,12-dihydropleiadene.

EXAMPLE 4

A mixture of 3.5 g. of 9-chloro-7-(3-dimethylaminopropylidene)-7,12-dihydropleiadene, 3.5 g. of red phosphorus and 15 ml. of 57% hydroiodic acid is refluxed with stirring for 24 hours. An additional 3.2 g. of red phosphorus and 13 ml. of 57% hydroiodic acid is added and refluxing continued to 48 hours. One gram of red phosphorus is added and refluxing continued to 72 hours. Then 3 g. of red phosphorus and 15 ml. of acetic acid is added and refluxed for six hours. The reaction mixture is made basic, extracted with chloroform and the dried extract is evaporated. The residue is chromatographed (50:50 hexane-benzene) to give the separated 9-chloro-7-(3 - dimethylaminopropyl - 7,12 - dihydropleiadene, B.P. 190° C./0.3 mm.

EXAMPLE 5

A solution of 15.0 g. of 7(12H)-pleiadenone in tetrahydrofuran is added to a tetrahydrofuran solution of the Grignard reagent formed from 16.2 g. of 3-(4-methyl-1-piperazinyl)-propyl chloride and 2.25 g. of magnesium. The resulting mixture is refluxed for six hours, decomposed with aqueous ammonium chloride solution and extracted with ether and chloroform. The extract is concentrated and the residue triturated with ether to give the separated 7-hydroxy-7-[3-(4-methyl-1-piperazinyl)-propyl]-7,12-dihydropleiadene, M.P. 209–210° C., dihydrochloride M.P. 73° C.

The above dihydrochloride (6.0 g.) and 44 ml. of methanol with 2 drops of concentrated hydrochloric acid is refluxed for 18 hours, concentrated, made basic and extracted with ether. The extract is evaporated to give 7-[3-(4-methyl-1-piperazinyl) - propylidene]-7,12-dihydropleiadene, dihydrochloride M.P. 258° C. (foam).

Similarly, reaction of 15.5 g. of 9-trifluoromethyl-7(12H)-pleiadenone as described above yields the corresponding product 9-trifluoromethyl-7-[3 - (4 - methyl-1-piperazinyl)-propylidene]-7,12-dihydropleiadene.

EXAMPLE 6

A mixture of 3.15 g. of 7-[3-(4-methyl-1-piperazinyl)-propylidene]-7,12-dihydropleiadene, 3.2 g. of red phosphorus and 20 ml. of 57% hydroiodic acid solution is refluxed with stirring for 24 hours. The reaction mixture is made basic to yield 7-[3-(4-methyl-1-piperazinyl)-propyl]7,12-dihydropleiadene, B.P. 200° C./0.25 mm.

EXAMPLE 7

A mixture of 3.0 g. of magnesium and 16.4 g. of 4-chloro-1-methylpiperidine in tetrahydrofuran is refluxed for one tand one-quarter hours, cooled and 15.0 g. of 7(12H)-pleiadenone is added in portions. The resulting mixture is refluxed and stirred for five and one-half hours. After standing overnight, the reaction mixture is poured into ice water containing 19.7 g. of ammonium chloride and extratced with ether. The ether layer is extracted with 3% phosphoric acid, made basic, extracted with ether and dried ether extract concentrated in vacuo. The residue is triturated with ether to leave the solid 7-hydroxy-7-(1-methyl-4-piperidyl)-7,12-dihydropleiadene, M.P. 200.5–202.5° C.

From the above ether triturate is obtained the 1,4-addition product, 6-(1-methyl-4-piperidyl)-7 - (12H) - pleiadenone, hydrochloride M.P. 317.5–319.5° C.

A solution of 4.0 g. of 7-hydroxy-7-(1-methyl-4-piperidyl)-7,12-dihydropleiadene hydrochloride in 20 ml. of glacial acetic acid and 70 ml. of concentrated hydrochloric acid is refluxed for three hours and then concentrated in vacuo. The residue is azeotroped with toluene, the solid taken up in water and extracted with ether. The aqueous layer is made basic with 10% sodium hydroxide solution, extratced with ether and the combined ether extract, after drying is evaporated. The residue is treated with hydrogen chloride in ethanol/ether to give 7-(1-methyl-4-piperidylidene)-7,12-dihydropleiadene hydrochloride, M.P. 216–219° C.

Similarly, employing an equivalent amount of 3-chloro-1-methylpyrrolidine in the above reaction sequence leads to the formation of the corresponding pyrrolidinyl alcohol intermediate, the 1,4-addition product and 7-(1-methyl-3-pyrrolidylidene)-7,12-dihydropleiadene.

EXAMPLE 8

A mixture of 12.0 g. of 7(12H)-pleiadenone and 3-dimethylamino-2-methylpropyl magnesium chloride (prepared as in Example 1 from magnesium and 3-dimethyl-amino-2-methyl-propyl chloride in tetrahydrofuran) is refluxed in tetrahydrofuran for six hours. Working up as in Example 1 gives 7-hydroxy-7-(3-dimethylamino-2-methylpropyl)-7,12-dihydropleiadene, the hydrochloride of which is refluxed in methanol with concentrated hydrochloric acid to yield 7-(3-dimethylamino-2-methylpropylidene)-7,12-dihydropleiadene.

EXAMPLE 9

A mixture of 2.8 g. of 7-(3-dimethylamino-2-methylpropylidene)-1,12-dihydropleiadene, 2.7 g. of red phosphorus and 10 ml. of 57% hydroiodic acid is refluxed for 24 hours and worked up as in Example 2 to give 7-(3-dimethylamino-2-methylpropyl)-7,12-dihydropleiadene.

EXAMPLE 10

A solution of 15.0 g. of 7(12H)-pleiadenone in tetrahydrofuran is added to a tetrahydrofuran solution of the Grignard reagent formed from 1 - benzyloxyethyl-4-(3-chloropropyl)-piperazine and magnesium and the resulting mixture is refluxed for six hours. Working up as in Example 5, there is obtained 7-hydroxy-7-[3-(4-benzyloxyethyl-1-piperazinyl)propyl] - 7,12 - dihydropleiadene. Heating this compound on a steam bath with concentrated hydrochloric acid in ethanol yields 7-[3-(4-hydroxyethyl-1-piperazinyl)-propylidene]-7,12-dihydropleiadene.

Hydrogenating the above prepared benzyloxy derivative using palladium-on-charcoal catalyst in ethanol gives 7-[3-(4-hydroxy-ethyl-1-piperazinyl)-propyl] - 7,12 - dihydropleiadene.

Reacting either hydroxyethyl piperazine with acetyl chloride in pyridine furnishes the corresponding acetoxyethylpiperazine compounds.

EXAMPLE 11

A solution of 9.5 g. of 7-(1-methyl-4-piperidylidene)-7,12-dihydropleiadene in 50 ml. of dry benzene is added dropwise to a stirred solution of 3.6 g. of cyanogen bromide in 15 ml. of benzene at room temperature. After the addition is complete the mixture is stirred for 90 minutes and allowed ot stand overnight. Following addition of 75 ml. of absolute ether, the product 7-(1-cyano-4-piperidylidene)-7,12-dihydropleiadene, is collected.

To a solution of 150 ml. of glacial acetic acid, 100 ml. of water and 15 ml. of concentrated hydrochloric acid is added 6.5 g. of the above cyano compound and the mixture is heated to reflux for 16 hours. The reaction mixture is concentrated and then treated with 100 ml. of 10% aqueous sodium hydroxide solution to give 7-hydroxy-7-(4-piperidyl)-7,12-dihydropleiadene.

The above 7-hydroxy-7,12-dihydropleiadene is dehydrated as described in Example 7 to yield 7-(4-piperidylidene)-7,12-dihydropleiadene.

Reducing the above prepared piperidylidene compound using phosphorus and hydroiodic acid gives 7-(4-piperidyl)-7,12-dihydropleiadene.

EXAMPLE 12

A mixture of 5.8 g. of 7(4-piperidylidene)-7,12-dihydropleiadene, 3.4 g. of n-propyl iodide and 2.8 g. of potassium carbonate in 75 ml. of toluene is refluxed and stirred for 30 hours. The cooled reaction mixture is treated with 50 ml. of water and 200 ml. of hexane and the separated organic layer is washed with additional portions of water. The hexane solution is concentrated to yield 7-(1-propyl - 4 - piperidylidene)-7,12-dihydropleiadene.

EXAMPLE 13

To a suspension of 6.5 g. of 7-(4-piperidylidene)-7,12-dihydropleiadene in 50 ml. of benzene is added 2.8 g. of allyl bromide in 5 ml. of benzene. The mixture is stirred at room temperature for 90 minutes, filtered and ether added to the filtrate. The filtrate is concentrated in vacuo to give 7-(1-allyl-4-piperidylidene)-7,12-dihydropleiadene, Similarly reaction with an equivalent amount of propargyl chloride yields 7-(1-propargyl-4-piperidylidene)-7,12-dihydropleiadene.

EXAMPLE 14

A slurry of 4.2 g. of 7-(4-piperidylidene)-7,12-dihydropleiadene in 50 ml. of methanol is cooled in an icebath, stirred and 3 g. of ethylene oxide in 5 ml. of methanol is added. The reaction mixture is allowed to stand at room temperature overnight and then concentrated in vacuo to furnish the product, 7-[1-(β-hydroxyethyl)-4-piperidylene]-7,12-dihydropleiadene.

Similarly, reaction of an equivalent amount of 7-(4-piperidyl)-7,12-dihydropleiadene with ethylene oxide yields the corresponding product 7-[1-(β-hydroxyethyl)-4-piperidyl]-7,12-dihydropleiadene.

EXAMPLE 15

A mixture of 1.1 g. of cyclopropane carbonyl chloride and 3.1 g. of 7-(4-piperidylidene)-7,12-dihydropleiadene in 25 ml. of pyridine is warmed on the steam bath for one hour. The reaction mixture is poured into dilute sodium hydroxide solution and extracted with methylene chloride. The organic extract is washed with water, dried and evaporated in vacuo to give 7-(1-cyclopropanecarbonyl-4-piperidylidene)-7,12-dihydropleiadene.

The latter compound is dissolved in ether and refluxed with a stirred suspension of lithium aluminum hydride in ether for four hours. The reaction mixture is decomposed, filtered and the filtrate concentrated in vacuo to yield 7-(1-cyclopropylmethyl - 4 - piperidylidene)-7,12-dihydropleiadene.

EXAMPLE 16

To the Grignard reagent formed from the freshly liberated free base of 16.1 g. of 2-(1-methyl-2-piperidinyl)-ethyl chloride hydrochloride and 1.9 g. of magnesium in about 100 ml. of tetrahydrofuran is added 15.0 g. of 9-chloro-7(12H)-pleiadenone. The mixture is refluxed and stirred under nitrogen for five hours, aqueous ammonium chloride is added and the mixture extracted with ether. The ether extract is extracted with dilute acid, the acid extract made basic, extracted with ether and the dried ether extract concentrated to give the separated 9-chloro-7 - hydroxy - 7-[2-(1-methyl-2-piperidinyl)-ethyl]-7,12-dihydropleiadene.

The above 7-hydroxy compound is refluxed in acid solution as described in Example 7 to yield 9-chloro-7-[2-(1-methyl-2-piperidinyl)-ethylidene] - 7,12 - dihydropleiadene.

Reducing the above prepared ethylidene compound using phosphorus and hydroiodic acid yields 9-chloro-7-[2-(1-methyl-2-piperidinyl)-ethyl]-7,12-dihydropleiadene.

EXAMPLE 17

Following the general procedure of Example 16, an equivalent amount of the Grignard reagent formed from 2-(1-methyl-2-pyrrolidinyl)-ethyl chloride is reacted with 15.0 g. of 9-chloro-7(12H)-pleiadenone in tetrahydrofuran to give the separated 9-chloro - 7 - hydroxy-7-[2-(1-methyl-2-pyrrolidinyl)-ethyl] - 7,12 - dihydropleiadene which is dehydrated to 9-chloro-7-[2-(1-methyl-2-pyrrolidinyl)-ethylidene]-7,12-dihydropleiadene. The latter is reduced to 9-chloro-7-[2-(1-methyl-2-pyrrolidinyl)-ethyl]-7,12-dihydropleiadene.

We claim:
1. A chemical compound having one of the following formulas:

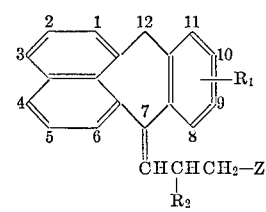 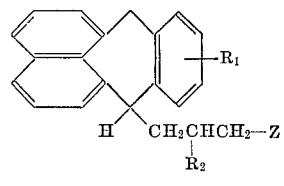

I  II or a pharmaceutically acceptable acid addition salt thereof, wherein:
$R_1$ is hydrogen, chloro, methyl, methoxy, methylthio or trifluoromethyl;
$R_2$ is hydrogen or methyl; and
Z is diloweralkylamino, N-pyrrolidinyl, N-piperidinyl, N'-lower alkyl-N-piperazinyl, N' - (β-acetoxyethyl)-N-piperazinyl or N'-(β-hydroxyethyl)-N-piperazinyl.

2. A chemical compound according to claim 1 in which $R_1$ is in the 9-position.

3. A chemical compound according to claim 2 in which $R_2$ is hydrogen and Z is dimethylamino.

4. A chemical compound according to claim 3 having Formula I in which $R_1$ is hydrogen, being the compound 7-(3-dimethylaminopropylidene)-7,12-dihydropleiadene.

No references cited.

JOHN D. RANDOLPH, Primary Examiner

U.S. Cl. X.R.

260—268; 293, 293.4, 294.7, 326.81, 326.84, 570.5, 570.8, 999